United States Patent
Li et al.

(10) Patent No.: US 7,549,156 B2
(45) Date of Patent: Jun. 16, 2009

(54) FAST CHANNEL SCANNING AND ACQUISITION SYSTEM AND METHOD FOR CABLE MODEM APPLICATIONS

(75) Inventors: Gordon Y. Li, San Diego, CA (US); Yoav Hebron, San Diego, CA (US); Bruce A. Grove, San Diego, CA (US); Adrian Kwong, San Diego, CA (US)

(73) Assignee: NXP B.V., Eindhoven (NL)

( * ) Notice: Subject to any disclaimer, the term of this patent is extended or adjusted under 35 U.S.C. 154(b) by 1007 days.

(21) Appl. No.: 10/677,110

(22) Filed: Oct. 1, 2003

(65) Prior Publication Data

US 2005/0076385 A1 Apr. 7, 2005

(51) Int. Cl.
*H04N 7/173* (2006.01)
(52) U.S. Cl. .................... 725/111; 725/118
(58) Field of Classification Search .......... 725/111, 725/119
See application file for complete search history.

(56) References Cited

U.S. PATENT DOCUMENTS

| | | | |
|---|---|---|---|
| 6,574,796 B1* | 6/2003 | Roeck et al. | 725/111 |
| 6,650,624 B1* | 11/2003 | Quigley et al. | 370/252 |
| 6,668,027 B1* | 12/2003 | Scarpa | 375/345 |
| 6,804,262 B1* | 10/2004 | Vogel et al. | 370/480 |
| 7,024,682 B2* | 4/2006 | Lavaud et al. | 725/126 |
| 7,139,247 B2* | 11/2006 | Desai et al. | 370/255 |
| 7,162,732 B2* | 1/2007 | Ovadia | 725/131 |
| 2002/0073433 A1* | 6/2002 | Furuta | 725/111 |

OTHER PUBLICATIONS

Broadcom Corporation, BCM3300 QAMLink® Single-Chip Docsis Cable Modem—BCM3300 Product Brief, 2003.*

* cited by examiner

*Primary Examiner*—Andrew Y Koenig
*Assistant Examiner*—Sari Sawaged

(57) ABSTRACT

A programmable channel scanning and acquisition method for a cable modem first performs a fast scan and then a slow scan to identify channels supporting cable modem services. The fast scan involves only a check of the cable modem AGC lock. A list of potentially operational channels is assembled and scanned. The list includes, in order of preference, the last known good channel, golden channels that are likely to support cable modem services, "learned" golden channels consisting of previous last known good channels, and other channels within the frequency plan range. The list omits channels on a "black list" known not to be operational and channels outside of the frequency range, except during registration. The method may be optimized by the setting of various parameters for operation in a DOCSIS or EuroDOCSIS environment.

13 Claims, 3 Drawing Sheets

FAST CHANNEL SCANNING AND ACQUISITION SYSTEM AND METHOD FOR CABLE MODEM APPLICATIONS

FIELD OF THE INVENTION

The present invention relates to fast channel scanning and acquisition methods for cable modem applications.

BACKGROUND OF THE INVENTION

In cable modem applications, the cable modem needs to scan downstream RF channels and acquire valid channels that are allocated for such operations. The speed of this scanning and acquisition operation is important for the provider of the cable modem services, since it is directly related to the quality of service offered to the customers by the provider. The speed of this operation varies widely in relation to the specific scanning and acquisition methods or algorithms that are used. Therefore, the development of fast methods and algorithms for such operations is a competitive advantage in the cable modem marketplace.

Known methods for channel scanning and acquisition are quite slow. Currently available cable modems can take up to five minutes for a complete scanning and acquisition cycle. Often, channels are scanned in a "brute force" manner, wherein time is spent seeking to acquire each possible channel and each channel is treated in the same manner. The problem is exacerbated in Europe, where the number of possible channels is much larger than in North America.

SUMMARY OF THE INVENTION

The present invention provides a programmable channel scanning and acquisition method for a cable modem. The method first performs a fast scan, and then a slow scan, of channels that potentially support cable modem services. The fast scan involves only a check of the cable modem AGC lock. Only if this check indicates the potential presence of a valid channels are more extensive acquisition efforts made during the fast scan.

A list of potentially operational channels is assembled and scanned. The list includes, in order of preference, the last known good channel, golden channels that are likely to support cable modem services, "learned" golden channels consisting of previous last known good channels, and other channels within the frequency plan range. During scanning, the last known good channel is frequently re-visited so that it may be quickly re-acquired if it becomes operational again.

The list omits channels on a "black list" known not to be operational and channels outside of the frequency range, except during registration. The method may be optimized by the setting of various parameters for operation in a DOCSIS or EuroDOCSIS environment.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

The present invention provides a system and method for cable modem channel scanning and acquisition that is not only substantially faster than methods currently in use, but is also more robust under various operating conditions in the field. The enhanced method provided by the present invention is parameterized by a set of programmable variables which can be set by cable modem operators via SNMP or configuration files to optimize the scanning and acquisition process to fit their specific cable plants. In addition, the channel scanning and acquisition method provided by the present invention can learn and automatically adjust certain parameters to adjust to field conditions.

Figure 1:
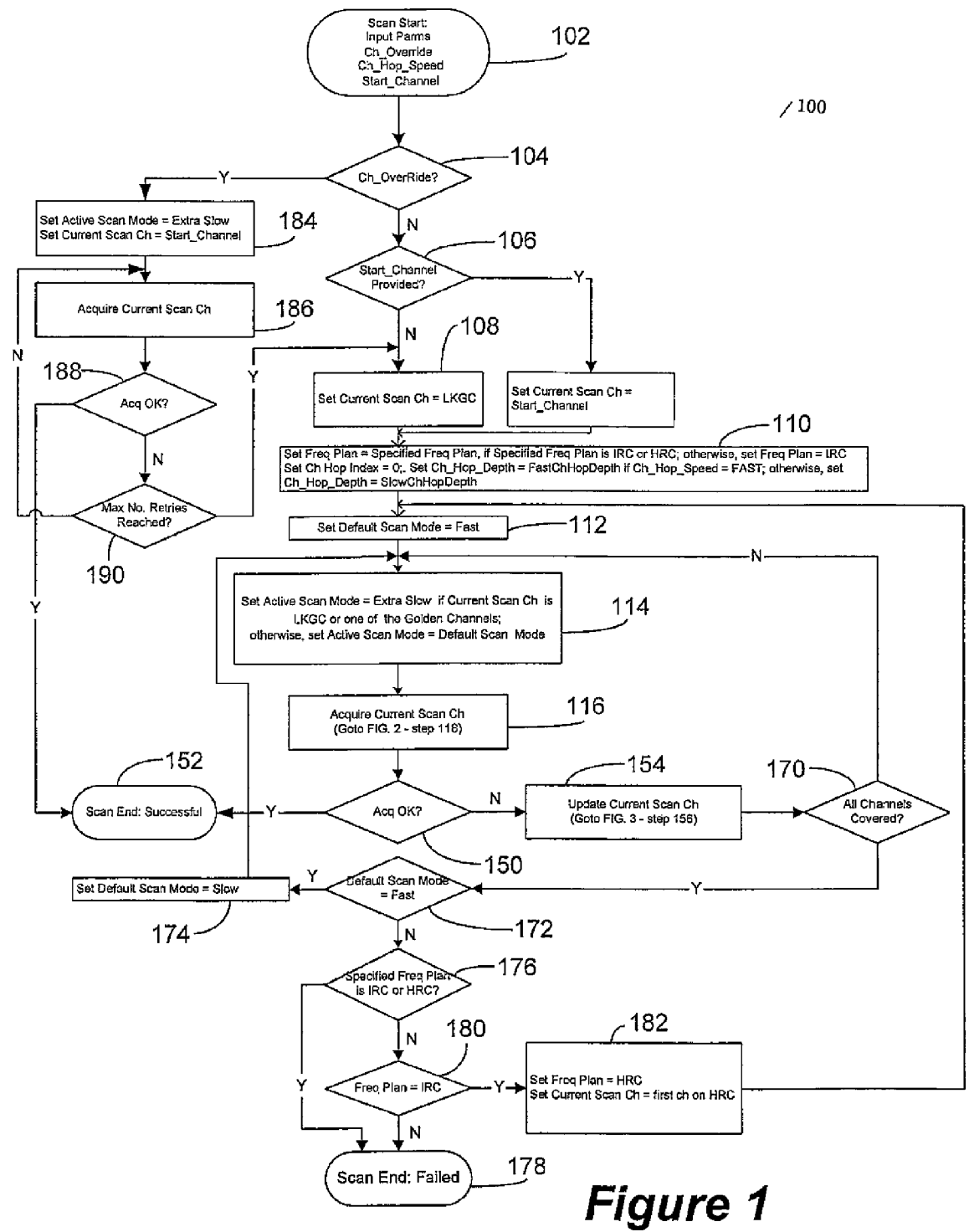
FIG. 1 is a flow chart setting forth a channel scanning and acquisition method for a cable modem according to the present invention.

FIG. 1 illustrates a method 100 for channel scanning and acquisition according to the present invention. Method 100 is a programmable "channel hopping" procedure that allows the last known good channel to be revisited periodically during scanning, so that the cable modem can quickly re-acquire the last known good channel if this channel becomes operational again (after a temporary RF-cable disconnection, for instance). The "channel hopping" frequency is programmable via SNMP or configuration file and can change according to the specific situations that have triggered the scanning.

The cable modem is also programmed with "golden" channels that are candidate channels likely to support cable modem services. In addition, a learning procedure is introduced to adaptively update such golden channels. The cable modem puts high priority on the golden channels during the scanning operation, thus substantially increasing the probability of quickly acquiring a valid channel. The cable modem is also programmed with "black-listed" channels that are known not to support cable modem services. The cable modem skips or puts low priority on these channels during the scanning operation, thus further speeding the operation. In an implementation that is particularly advantageous in Europe, the scanning operation incorporates a mechanism that allows the cable modem to quickly skip multiple invalid channels that are centered at black-listed channels.

Method 100 uses a set of programmable variables to optimize the scanning and acquisition process. In one implementation, the variables are implemented as MIB (Management Information Base) variables. The variables used by method 100 are as follows:

| Parameter | Description |
| --- | --- |
| LowDownstreamChannelFreq | The first downstream channel frequency in the scan range.<br>Default:<br>91 MHz (DOCSIS);<br>108 MHz (EuroDOCSIS). |
| HighDownstreamChannelFreq | The last downstream channel frequency in the scan range before wrapping back to LowDownstreamChannelFreq.<br>Default:<br>857 MHz (DOCSIS);<br>862 MHz (EuroDOCSIS). |
| BlackListDownstreamChannelFreqTable | A set of downstream channel frequencies that should be skipped during scanning.<br>Default: Empty |
| MaxNumProvisionedBlackList | The maximum number of black list entries.<br>Default: 64 |
| EuroScanStep | Multiple of 0.25 MHz - applicable to EuroDOCSIS implementation only.<br>Default: 1 |
| GoldenListDownstreamChannelFreqTable | A set of most likely valid DOCSIS downstream channel frequencies. This may be created internally or remotely (e.g. to contain some previously operational downstream channels).<br>Default: Empty |
| MaxNumGoldenList | The maximum number of golden list entries. The maximum number of golden list entries plus the maximum number of black list entries should not exceed 128.<br>Default: 64 |
| MaxNumLearnedGoldenList | The maximum number of "learned" golden list entries. This value must not exceed MaxNumGoldenList. The maximum number of provisioned golden list entries is determined by MaxNumGoldenList minus MaxNumLearnedGolden list.<br>Default: 5 |
| ScanGoldenListOnly | When this variable is set to TRUE, only golden list channels are scanned. This variable is not effective after power up and before registration is complete. It is effective after registration is complete or after a soft reset.<br>Default: FALSE |
| MaxChannelRetries | The maximum number of scan retries on a channel frequency.<br>Default: 1 |
| FastChannelHopDepth | The number of channel frequencies to scan before hopping back to the last known good channel (LKGC) during a fast channel hopping operation. This variable must not exceed SlowChannelHopDepth. If set to zero, fast channel scanning is disabled.<br>Default: 10 |
| SlowChannelHopDepth | The number of channel frequencies to scan before hopping back to the LKGC during a slow channel hopping operation. If set to zero, slow channel scanning is disabled.<br>Default: 100 |
| MaxDOCSISPIDInterval | The maximum time interval waiting for a DOCSIS protocol identifier (PID). Used to quickly skip non-DOCSIS channels during channel acquisition. Determined by the MAP or SYNC interval. If set to zero, bypass the lock of DOCSIS PID.<br>Default: 200 ms. |
| SpecifiedFrequencyPlan | The frequency plan to be scanned. May be set to IRC, HRC, NA (North America), EURO, DOCSIS-EURO or AUTO.<br>Default:<br>NA (North America)<br>AUTO (Europe) |
| ScanDirection | Direction of Scanning (UP or DOWN)<br>Default: DOWN |

In addition to the above, several non-volatile parameters are stored, preferably in NVRAM. Last_Known_Good_Channel (LKGC) is the downstream channel frequency that is last known to be operational, and is updated whenever a new downstream channel becomes operational. If LKGC is not specified (i.e., before the first time that the cable modem enters the normal operation state in the field), it should be defaulted to the default value of LowDownstreamChannelFreq if ScanDirection is "UP"; otherwise, it should be defaulted to the value of HighDownstreamChannelFreq. Note that during downstream channel overriding (to be described below), LKGC should not be updated until overriding is successfully completed. Last_Known_Good_Upstream_Channel (LKGUC) must also be stored in NVRAM. It is the upstream channel ID that is last known to be operational, and is updated whenever a new upstream becomes operational. The cable modem tries the LKGUC first after acquiring the corresponding LKGC downstream channel.

Referring again to scanning and acquisition method 100 in FIG. 1, the input parameters DS_Channel_Override_In_Effect, Channel_Hop_Speed and Start_Channel are first reviewed (step 102). DS_Channel_Override_In_Effect specifies whether downstream channel overriding is in effect, that is, whether method 100 is instructed to acquire a specific channel. If set to TRUE, downstream channel override is in effect; if set to FALSE, downstream channel override is not in effect. Channel_Hop_Speed specifies the speed of the channel-hopping operation during downstream scanning. This parameter will be set to either FAST or SLOW, and will be associated with the corresponding setting of FastChannelHopDepth or SlowChannelHopDepth. Start_Channel designates the first downstream channel frequency to scan. If DS_Channel_Override_In_Effect is set to TRUE, then Start_Channel will be set to the overriding channel provided by the CMTS.

If channel overriding is not in effect (step 104), and no start channel has been provided (step 106), the scanning operation starts at the last known good channel (LKGC) (step 108). That is, the current scan channel is set to the LKGC. If LKGC is not specified (i.e., before the first time that the cable modem enters the normal operation state in the field), it should be defaulted to the default value of LowDownstreamChannelFreq if ScanDirection is "UP"; otherwise, it should be defaulted to the value of HighDownstreamChannelFreq.

In step 110, the frequency plan is set to the specified frequency plan (IRC or HRC). If no frequency plan is specified, then it is defaulted to IRC, which will be scanned first. The channel hop depth (Ch_Hop_Depth) is set to the FastChannelHopDepth if the channel hop speed is FAST, otherwise, Ch_Hop_Depth is set to the SlowChannelHopDepth. Step 112 indicates that the default scan mode is fast; that is, absent an overriding setting, method 100 begins with a fast scan to see if the downstream channel can be quickly acquired.

In step 114, if the current scan channel is the LKGC or one of the golden channels, the active scan mode is set to extra slow. That is, if method 100 is currently considering a channel that is the last known good channel or is on the "golden list" of channels most likely to be operational, there is high probability that the current scan channel will be acquired. Therefore, the scanning operation is slowed down to maximize the effort in acquiring that channel.

An attempt is made to acquire the current scan channel in step 116. The effort involved in acquiring the current scan channel depends on the scan mode setting (fast or slow). Generally speaking, for a faster scan mode the acquisition effort involves fewer steps and is briefer, while for a slower scan mode the acquisition effort involves more steps and is slower. The fast scan mode takes advantage of information provided by the state of the automatic gain controller (AGC) in the cable modem. While the status of the AGC is not completely reliable, it does provide enough information to decide if a further attempt to lock is warranted. If the AGC is locked, indicating that there is some signal that the modem receiver is attempting to amplify, then further attempts are made to acquire the signal. If the AGC is not locked, no further attempts are made to acquire the signal and the method moves on to the next channel. Since AGC lock can be checked very quickly (fast scan—10 ms; slow scan—70 ms), checking whether the AGC is locked can provide a very quick, preliminary indication of whether the channel might be acquired before spending more time trying to acquire the channel. In slow scan mode, further efforts are made to acquire the channel regardless of the AGC state.

Figure 2:
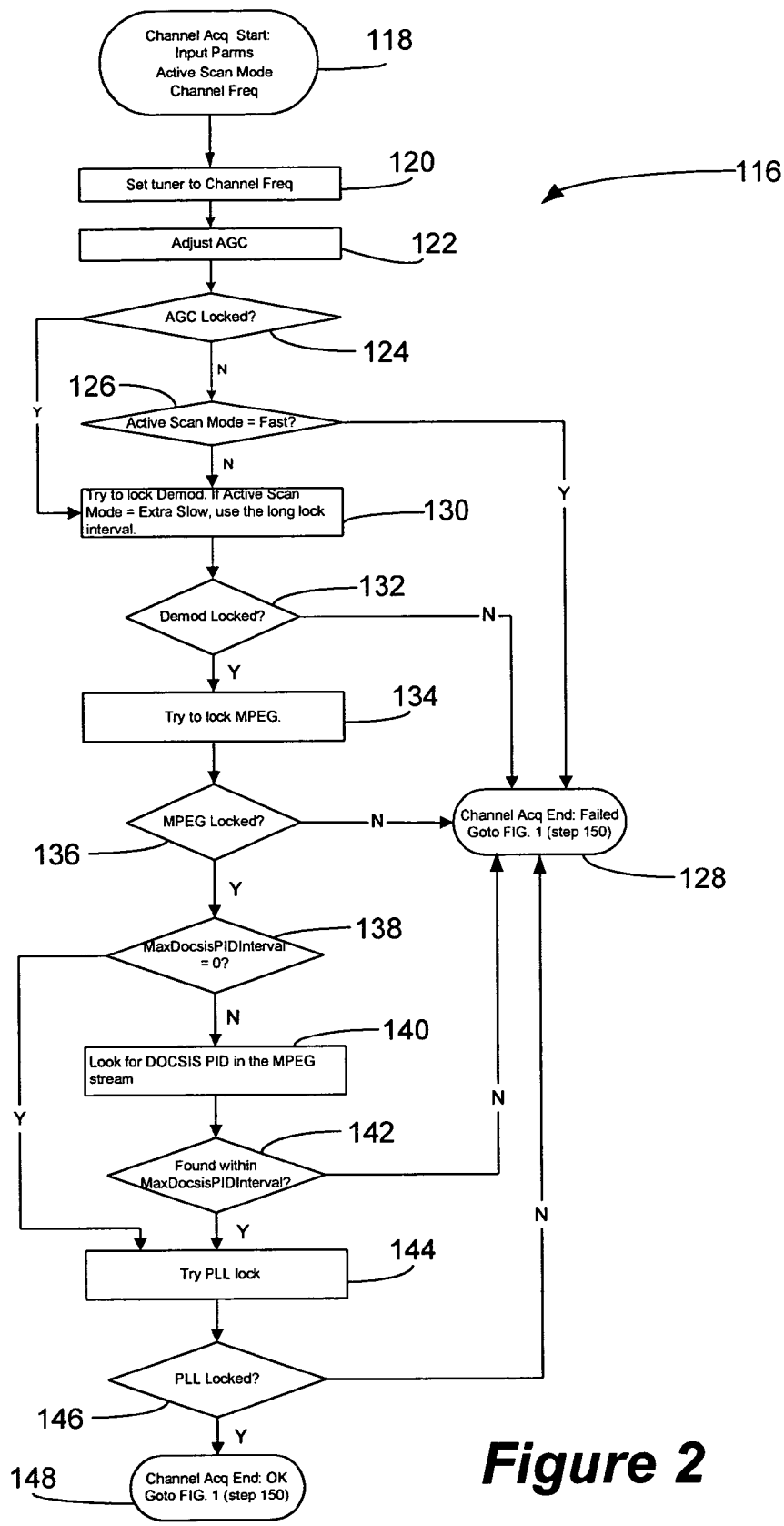
FIG. 2 is a flow chart setting forth a current scan channel acquisition method according to the present invention.

One implementation of the sub-steps involved in acquisition step 116 is depicted in FIG. 2. Step 118 shows the input parameters needed to carry out attempted acquisition: the active scan mode (e.g., FAST, SLOW) and the current scan channel frequency. In step 120, the cable modem tuner is set to the current channel frequency. In steps 122 and 124, the state of the AGC is considered. If the AGC is locked, regardless of the scan mode setting, further efforts to acquire the channel are warranted and acquisition efforts continue in step 130. If the AGC is not locked, and the scan mode is set to fast (step 126), no further efforts are made to acquire that channel (step 128).

If the AGC state indicates that a signal may be present (AGC locked), or even if the AGC is not locked but the scan mode is not FAST, more extensive efforts are made to acquire the channel. Generally, this involves checking the "lock" states of various receiver components, with a lock indicating that a signal is present. Note, in step 130, if the scan mode is "extra slow", a longer interval for checking lock state is used. Steps 130 and 132 check the lock state of the demodulator. If not locked, acquisition efforts are terminated. Steps 134 and 136 determine the NPEG lock state: if the signal contains something other than a DOCSIS MPEG stream, i.e., a television signal, there is no use in wasting further time on it. Hence, if an MPEG signal is not locked, acquisition efforts are terminated. Steps 138, 140, 142 check for the presence of a DOCSIS protocol identifier in the MPEG stream for the maximum time interval as specified by the parameter MaxDocsisPIDInterval. If a DOCSIS PID is not found within the specified interval, acquisition efforts are terminated. Note that, in step 138, a setting of MaxDocsisPIDInterval to '0' signals the processor to bypass this step and move onto a check of the PLL lock (step 144). If the receiver PLL is locked (steps 144, 146), it is determined that a signal is present and the channel is acquired (step 148). If the PLL is not locked, acquisition fails.

Hence, successful channel acquisition entails confirmation of AGC lock, demod lock, MPEG lock, a DOCSIS PID and PLL lock. In fast scan mode, however, if AGC lock is not present the remaining checks are bypassed and the method moves on to check the next scan channel. As will be described, if fast scan does not result in successful acquisition, then all channels are then "slow scanned" and subjected to more rigorous, and time-consuming, acquisition efforts. Finally, it is noted that the design and configuration of tuners, AGCs, demodulators and PLLs in cable modems is well known in the art and need not be illustrated or described in detail herein.

Referring again to FIG. 1, after attempts to acquire the current channel (step 116—FIG. 2) have been completed, if a channel was successfully acquired (step 150) the method is complete (step 152). If a channel was not acquired, the current scan channel is updated (step 154). A channel scan list is defined and maintained for a given frequency plan (IRC or HRC) and consists of ordered channel frequencies. The scan list is at its longest on power up and before a first successful registration has been achieved, and contains channel frequencies ordered as follows:

(A) LKGC;

(B) Provisioned Golden Channels in GoldenDownStreamChannelFreqTable, excluding LKGC if it is present;

(C) Learned Golden Channels in GoldenListDownstreamChannelFreqTable, excluding LKGC if it is present;

(D) All non-LKGC, non-Golden-list and non-Black-list channels in ascending order and starting from LKGC+1 (first frequency in this list that is higher than LKGC) if ScanDirection=UP; otherwise, other channels in descending order starting from LKGC−1 (first frequency in this list that is lower than LKGC);

(E) Black List channels; and (F) All valid channels outside of the range between LowDownstreamChannel Freq and HighDownstreamChannelFreq. In DOCSIS, for example, the valid channel center frequencies are between 91 MHz and 857 MHz.

Before registration, it is important to check even the black list and out-of-range frequencies, since the original black list channels and original operating frequency range may not apply when the cable modem is relocated from one service area to another. To ensure that the cable modem is not locked out permanently in such cases, all valid channels must be given a chance to be scanned. After registration, the cable modem is provisioned with the current black list channels and current center frequency range, and the black list channels and out-of-range channels (E) and (F) can be removed from the scan list. Also, after registration, if the parameter ScanGoldenListOnly is FALSE, the scan list will contain list entries (A)-(D); if ScanGoldenListOnly is TRUE, the scan list contains only entries (A)-(C) (LKGC and golden list channels).

The Golden List downstream channels are stored in a physical, ordered table (GoldenListDownstreamChannelFreqTable) having a maximum number of "provisioned" channels and a maximum number of "learned" channels. The provisioned channels are added to the golden list table during registration by a configuration file or during normal operation via SNMP, if they are not in the table yet. The learned golden list channels are set by the cable modem during the scanning procedure. Whenever the LKGC is changed, the old LKGC is added to the "learned" golden list channels as the last learned entry in a circular-buffer fashion, so long as the old LKGC is not already an existing learned entry.

Figure 3:
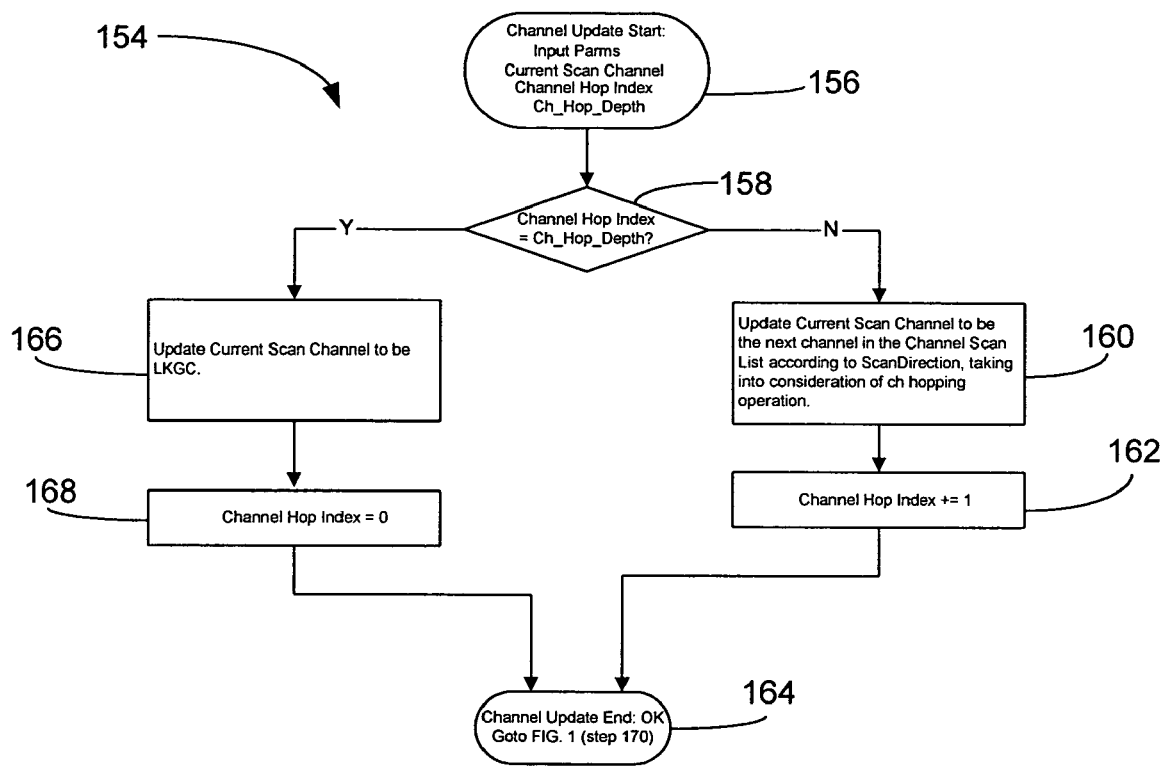
FIG. 3 is a flow chart setting forth a current scan channel update method according to the present invention.

Step 154 for updating the current scan channel is shown in more detail in FIG. 3. The necessary input parameters for updating the current scan channel are: the current scan channel, the channel hop index and the channel hop depth (step 156). The channel hop index is the number of frequencies that have been scanned in the current scanning operation, and the channel hop depth is the total number of frequencies that should be scanned. For fast scanning the channel hop depth will be less (less total frequencies scanned) and for slow scanning the channel hop depth will be greater (more total frequencies scanned).

If the channel hop index has not yet reached the channel hop depth (step 158), the current scan channel is updated to be the next channel in the channel scan list (an ordered list of frequencies per the above description), taking the scan direction into consideration (step 160). The channel hop index is increased by one (step 162), and the current scan channel update is finished (step 164). If the channel hop index has reached the channel hop depth (step 158), then the current scan channel is returned to the LKGC (step 166), the channel hop index is reset to zero (step 168), and the current scan channel update is finished (step 164). In this manner, the method periodically returns to check the LKGC in case it has come back. The setting of the channel hop index prevents excessive return to the LKGC and delay.

If all channels in the channel list have not yet been covered in the current scan (step 170), the method proceeds back to step 116, using the same scan speed, and attempts to acquire the current scan channel as updated in step 154. If all channels in the list have been covered, and the scan mode is fast (step 172), then the scan mode is changed to slow (step 174) and the scanning process is repeated. Thus, if the channel was not acquired in a first run through where channels were discarded if there was no AGC lock, a second pass is made at a slower speed where greater efforts (FIG. 2) are made to acquire the channel.

If both a fast and a slow scan of the entire channel list have been performed, a check is made in step 176 as to whether the frequency plan was specified (IRC or HRC). If the frequency plan was specified, that means all frequencies in the specified frequency plan have been scanned, both slow and fast, and nothing was acquired. The method terminates in step 178 with a failed scan. If the frequency plan was not specified, and its current setting is still IRC (step 110), then HRC has not yet been searched. The frequency plan is set to HRC and the current scan channel is set to the first channel on HRC (step 182). As with IRC, the method first begins with a fast scan (step 112). If no frequency plan was specified but both IRC and HRC have been fast and slow scanned, the method terminates unsuccessfully in step 178.

Finally, as mentioned with respect to step 104, there is the possibility that a channel override has been set. In this case, an extra slow scan is first performed on the override channel (step 184). The method proceeds in step 186 as an extra slow scan, following the entire FIG. 2 sequence. If the channel is acquired (step 188), the scan ends (step 152). If it is not acquired after a set number of retries (step 190), the method proceeds to step 108, setting the scan channel as the LKGC and proceeding with fast and slow scans as described above.

The method has thus far been described assuming a North American DOCSIS implementation. For a EuroDOCSIS implementation, the method is slightly different. At the beginning of the scan in FIG. 1, step 110, the frequency plan is set to EURO and steps 176, 180 and 182 may be omitted. That is, if a slow and fast scan of the EURO frequency plan does not result in a channel acquisition, the method terminates. There is no need to search the IRC and HRC plans as in North America.

In Europe, channels are only 250 kHz apart and they may be anywhere on the grid (108 MHz to 862 MHz), separated by 250 kHz steps. This is in contrast to North America, where channels are located 6.25 MHz apart at known frequencies. The MIB variable EuroScanStep deals with this difference. It is initially set to 1 MHz. At this spacing, an AGC lock and demod lock (FIG. 2) may result even if the frequency is not exactly centered. In order to determine the center frequency, the acquisition method of FIG. 2 is slightly modified. After AGC and demod lock have been detected (step 132), before checking for the presence of an MPEG signal, the method checks to see whether the demod frequency offset is greater than 30 kHz. If it is, the tuner is then set to the nominal frequency that is closest to the frequency implied by the demod offset. The AGC and demod lock are then checked again, and eventually, the demod freq offset will be less than 30 kHz indicating that the center frequency has been proximately found.

Alternatively, or should there be any problem with the above method, the EuroScanStep could be set to 750 kHz, 500 kHz or, in a worst case, 250 kHz. Smaller scan step settings, of course, will come with a trade off in scanning and acquisition speed.

Black-list frequencies are also dealt with in a slightly different manner under EuroDOCSIS. "Blackened" channels are not only the actual black listed frequency, but include a range of 7-8 MHz centered on each black list frequency. Hence, frequencies on the Euro black list may include not only the black list frequencies themselves, but all frequencies that are within ±(BlackListChannelSpacing/2) range of any black list channel.

In one implementation, the scanning and acquisition method set forth herein is implemented in the operating software of a cable modem. Preferably, the software is written in accordance with the DOCSIS specification.

While various embodiments of the invention have been described, it will be apparent to those of ordinary skill in the art that many more embodiments and implementations are possible that are within the scope of this invention.

What is claimed is:

1. A cable modem channel scanning and acquisition method comprising:
   performing a fast scan of each channel in a list of candidate channels for supporting cable modem services, the fast scan including the steps of
     identifying potentially valid channels by considering a first operating state of the cable modem; and
     attempting to acquire at least one potentially valid channel that has been identified by the fast scan; and,
   in response to not acquiring at least one valid channel during the fast scan, performing a slow scan of each channel in the list, the slow scan of each channel in the list including the steps of
     identifying potentially valid channels by considering a plurality of additional operating states of the cable modem; and
     attempting to acquire at least one potentially valid channel that has been identified by the slow scan.

2. A method as claimed in claim 1, wherein the first operating state is AGC lock state.

3. A method as claimed in claim 1, wherein the first channel considered is the last known good channel, and wherein, during the same acquisition attempt, the method periodically returns to and attempts to acquire the last known good channel.

4. A method as claimed in claim 3, wherein the frequency of attempts to acquire the last known good channel is determined by a programmable channel hop depth that is less than the number of channels in the list of candidate channels.

5. A method as claimed in claim 1, wherein the method first attempts to acquire channels on a golden list of channels that are likely to support cable modem services.

6. A method as claimed in claim 5, wherein the golden list is adaptively updated by adding the previous last known good channel to the golden list whenever the last known good channel is updated.

7. A method as claimed in claim 5, wherein the method does not attempt to acquire channels on a black list of channels that are not likely to support cable modem services.

8. A method as claimed in claim 7, wherein the method does not attempt to acquire channels outside the range of the applicable frequency plan.

9. A method as claimed in claim 8, and comprising an initial scanning and acquisition procedure performed prior to first registration of the modem wherein channels on the black list and outside the range of the applicable frequency plan are scanned, but are not scanned thereafter.

10. The method as claimed in claim 1, wherein the slow scan step comprises considering both the first operating state and a second operating state of the cable modem, wherein the second operating state indicates the presence of a valid channel and is different from the first operating state.

11. The method as claimed in claim 1, wherein the slow scan scans at a slower speed than the fast scan to acquire the channel.

12. The method as claimed in claim 1, wherein the plurality of additional operating states of the modem includes a lock state of a demodulator and a PLL lock of a PLL.

13. The method as claimed in claim 1, wherein the slow scan mode scans the plurality of operating states even when the first operating state does not indicate the presence of a valid channel.

* * * * *